July 25, 1961 F. R. ROGERS 2,993,495
FUEL CONTROL APPARATUS FOR AN ENGINE
Filed June 19, 1956 3 Sheets-Sheet 1

INVENTOR.
FRANCIS R. ROGERS
BY
H.S. Brodahl
ATTORNEY

July 25, 1961 F. R. ROGERS 2,993,495
FUEL CONTROL APPARATUS FOR AN ENGINE
Filed June 19, 1956 3 Sheets-Sheet 2

INVENTOR.
FRANCIS R. ROGERS
BY
ATTORNEY

July 25, 1961 F. R. ROGERS 2,993,495
FUEL CONTROL APPARATUS FOR AN ENGINE
Filed June 19, 1956 3 Sheets-Sheet 3

INVENTOR.
FRANCIS R. ROGERS
BY
R.S. Brodahl
ATTORNEY

United States Patent Office 2,993,495
Patented July 25, 1961

2,993,495
FUEL CONTROL APPARATUS FOR AN ENGINE
Francis R. Rogers, South Bend, Ind., assignor to The Bendix Corporation, a corporation of Delaware
Filed June 19, 1956, Ser. No. 592,460
7 Claims. (Cl. 137—34)

The present invention relates to fuel control apparatus for an internal combustion engine, and more particularly to an engine speed responsive fuel control apparatus for a gas turbine or like engine.

It is an object of the present invention to provide an improved fuel control apparatus for an internal combustion engine.

It is another object of the present invention to provide an improved engine speed responsive fuel control apparatus for an internal combustion type of engine.

It is an additional object of the present invention to provide an improved power actuated fuel control apparatus which fuel control apparatus is responsive to the operative speed of the engine.

It is a different object of the present invention to provide an improved control apparatus for the fuel metering valve, which control apparatus is responsive to the off speed error of the engine, and includes a stabilizing device which allows a variable control response as a function of that speed error.

It is a further object of the present invention to provide an improved control apparatus for a fuel metering valve, which control apparatus is responsive to engine speed and is operative to give a slower corrective response to smaller errors and then is operative to give a faster corrective response to a second range of larger speed errors, with a modified corrective response to a portion of said first range of speed errors.

These and other objects and advantages will become apparent in view of the following description taken in conjunction with the drawings wherein.

Figure 1:
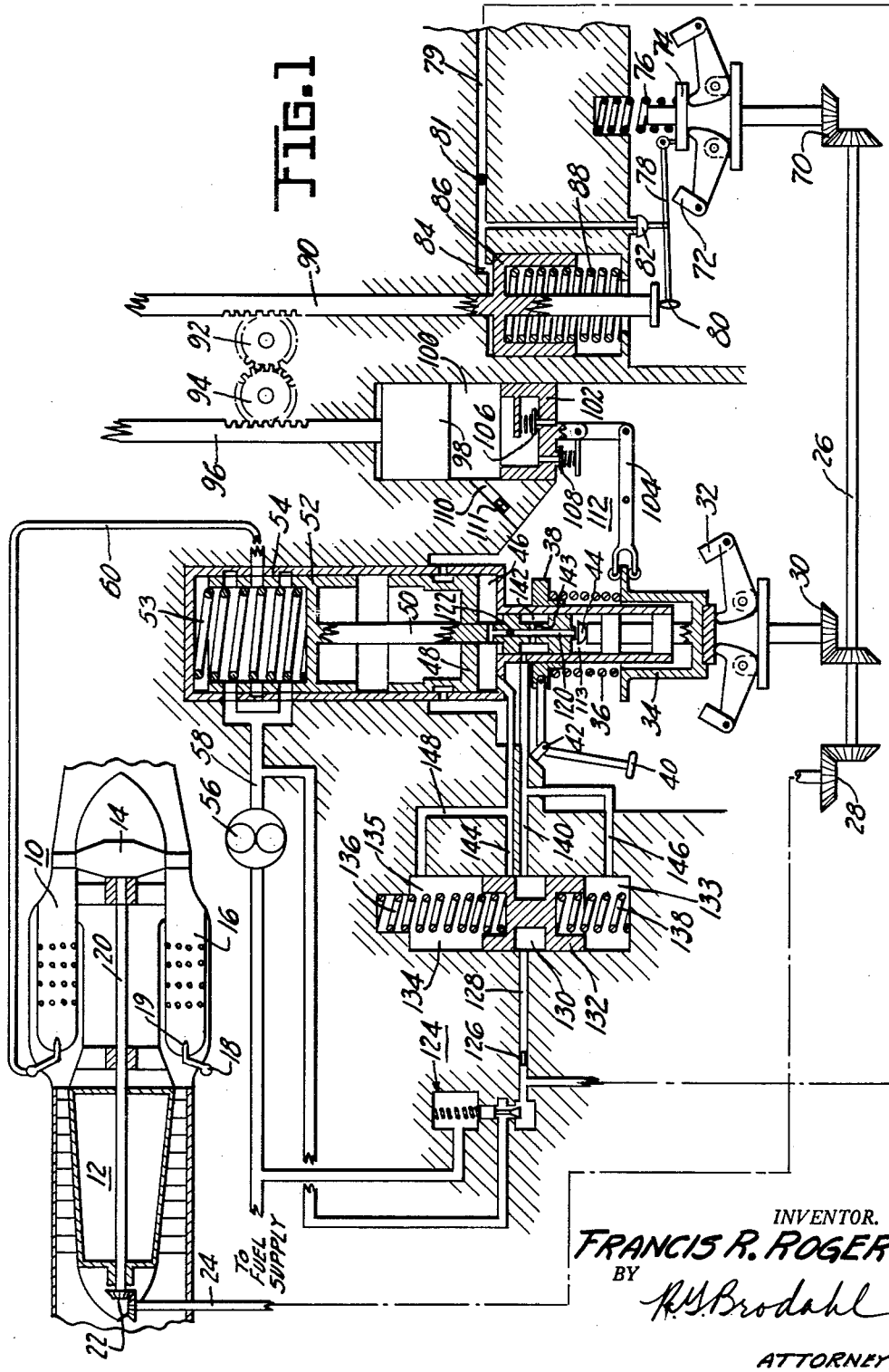
FIGURE 1 is a schematic diagram of fuel control apparatus in accordance with the present invention.

In FIGURE 1 there is shown a gas turbine engine 10 including a compressor unit 12 and a turbine 14. The combustion chambers 16 are supplied fuel from a manifold 18 through nozzles 19, and the drive shaft 20 connected between the turbine 14 and the compressor 12 is connected through a set of bevel gears 22 to a control shaft 24 which is connected to a second control shaft 26 through a second set of bevel gears 28. The second control shaft 26 through a third set of bevel gears 30 drives a pair of speed responsive fly weights 32. The force output of the speed responsive fly weights 32 is applied to a control member 34 against the action of a compression spring member 36 as determined by a throttle control member 38. The throttle control member 38 is positioned by means of a manual control throttle 40 which is pivoted around fixed pivot connection 42. The control member 34 is operative to position a servo half ball or pilot valve member 44 which is operative to control the fluid pressure within a first fluid chamber 46. A pressure responsive piston member 48 is operative with the fluid chamber 46 and is connected through a connecting arm 50 to the fuel metering valve member 52 which is operative with a sleeve member 54 to control the fuel flow between a fuel supply pump 56 operative with a first fuel conduit 58 and a second fuel conduit 60 which is connected to the fuel manifold 18.

The control shaft 26 is also connected to a fourth set of bevel gears 70 which is operative to rotate a second pair of speed responsive fly weights 72. The force output of the speed weights 72 is applied to a control member 74 which acts against a compression spring member 76. The control member 74 is pivotally connected to a control arm 78 which acts about a fulcrum 80 to position a half-ball member 82. Servo control pressure is applied through conduit 79 and bleed member 81 to the fluid chamber or conduit 84. The half-ball member 82 is operative to control the fluid pressure within the fluid chamber 84 to thereby move a control piston member 86 against a compression spring member 88 as a function of the force output of the speed weights 72. The control piston 86 is connected to a rack member 90 which is operative through a first gear or pinion 92 and a second gear or pinion 94 to control the position of a second rack member 96.

The second rack member 96 is connected to a control piston 98 which is operative through a fluid pressure within a fluid chamber 100 to control the movement of a second control piston 102. The second control piston 102 is connected through the control arm 104 to the control member 34 as shown in FIGURE 1. The second control piston 102 includes a first spring biased check valve 106 and a second spring biased check valve 108. Also a small bleed passage 110 including control bleed member 111 is provided from the fluid chamber 100 to the pump inlet pressure reference fluid chamber 112.

The half-ball 44 is operative to control the fluid pressure with the fluid chamber 46 through a fluid passage 120 which includes a control bleed 122. Servo control fluid for the fluid chamber 46 is supplied from a conventional and well known servo pressure regulator device 124, through a control bleed 126 and a first fluid conduit 128 which leads to a fluid chamber 130 formed as an annular recess in a control piston 132 which is operative within a fluid chamber 134 and is positioned between a first compression spring member 136 and a second compression spring member 138. The annular recess 130 is shown connected to a second servo pressure fluid conduit 140 which leads to a fluid chamber 142 which is connected to the servo fluid conduit 120 through openings 143. If the control piston member 132 is moved upward against the action of the compression spring member 136 a sufficient distance, the annular recess chamber 130 is also connected to a second fluid conduit 144 which leads to the fluid chamber 46. A fluid conduit 146 is connected between the fluid conduit 140 and a first end 133 of the fluid chamber 134 and another fluid conduit 148 is connected between the fluid conduit 144 and the opposite end 135 of the fluid chamber 134.

Figure 2:
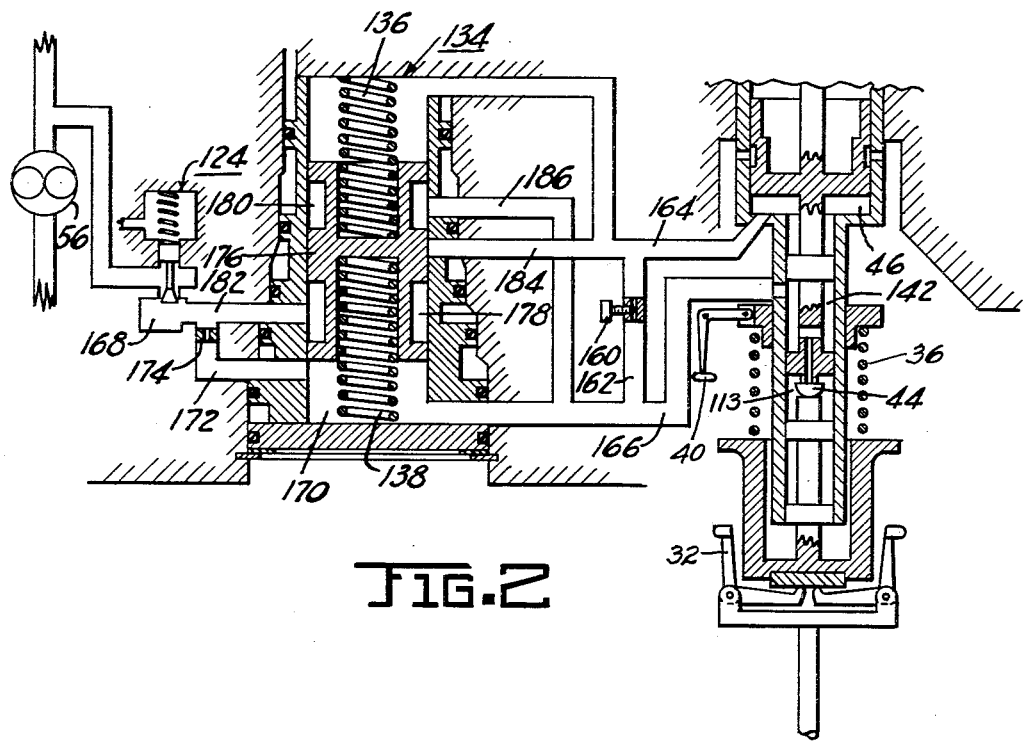
FIGURE 2 is a schematic diagram of a modified form of the fuel control apparatus shown in FIGURE 1.

Referring to the modification of the apparatus of FIGURE 1 as shown in FIGURE 2, like numerals have been used for similar components. In FIGURE 2 there is shown an adjustable bleed member 160 positioned within a fuel conduit 162 which is connected between a fuel conduit 164 that is connected to the fluid chamber 46 and a second fluid conduit 166 which is connected to the fluid chamber 142. In the apparatus of FIGURE 2 the half-ball 44 controls the fluid pressure within the fluid chamber 142. The fluid conduit 166 is connected to the regulated servo control fluid pressure chamber 168 through a control fluid chamber 170 formed at one end of the fluid cylinder 134 and a fluid conduit 172 including a control bleed 174. A control piston 176 is movable within the control cylinder 134 in a first direction against the action of compression spring member 136 and in a second direction against the action of a second compression spring member 138. The control piston member 176 includes a first annular recess 178 and a second annular recess 180. When the control piston 176 is moved in a first or upward direction a sufficient distance the first annular recess 178 is connected between a fluid conduit 182 connected to the servo regulated pressure fluid chamber 168 and a fluid conduit 184 connected to the fluid conduit 164. On the other hand if the control piston 176 is moved in a second or downward direction a sufficient amount the second annular recess 180 is connected between the fluid conduit 184 and the fluid conduit 186.

Figure 3:
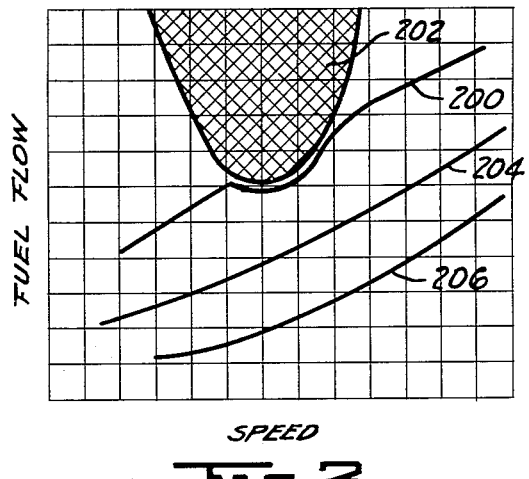
FIGURE 3 is a curve chart of engine fuel flow plotted as a function of engine speed.

In FIGURE 3 there is shown a curve chart illustrating the relationship of fuel flow to a typical gas turbine engine as a function of engine speed. The acceleration curve 200 avoids the compression unstable operating or stall area 202. The engine fuel required to run curve 204 and the deceleration curve 206 are shown.

Figure 4:
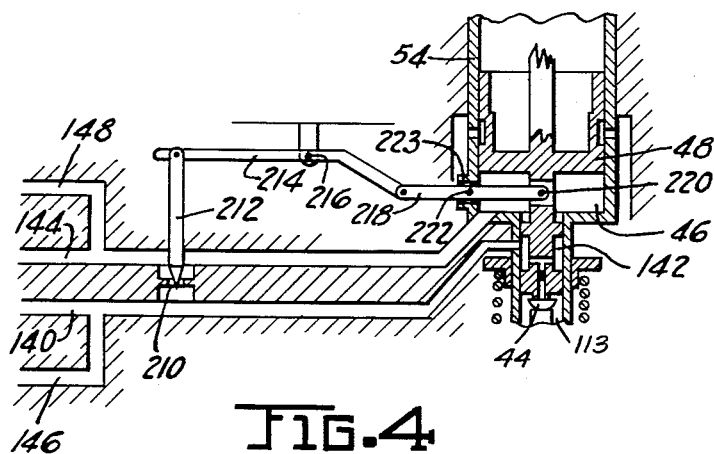
FIGURE 4 is a partial schematic showing of a modification of the apparatus shown in FIGURE 1.

In FIGURE 4 there is shown a modification of the apparatus shown in FIGURE 1. In the apparatus of FIGURE 4, a variable bleed or control orifice 210 is positioned between the fluid conduits 140 and 144 and thereby is effectively connected between the fluid chamber 46 and the fluid chamber 142. The control orifice 210 includes a movable needle valve member 212, which is positioned by a linkage member 214 pivoted about fixed pivot 216 and connected to linkage member 218. The latter linkage member 218 is fastened to piston member 48 at connection 220 and is pivoted about pivot connection 222 on the sleeve member 54. The pivot connection 222 includes a fluid seal 223.

Figure 5:
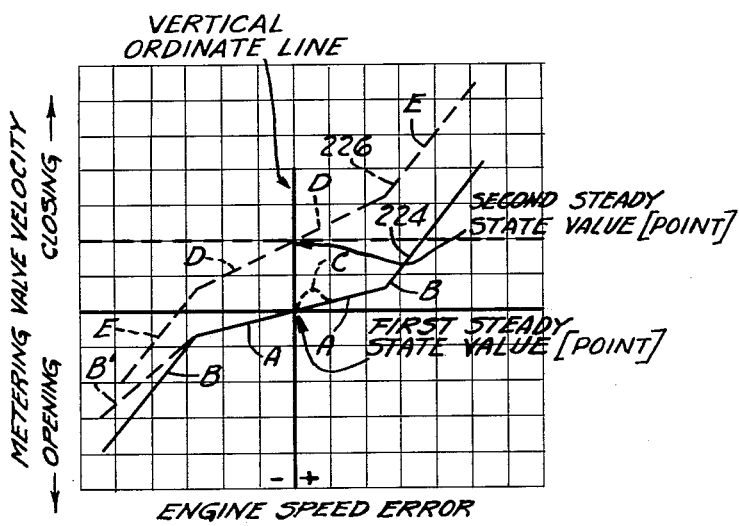
FIGURE 5 is a curve chart of metering valve movement velocity plotted as a function of engine speed error.

In FIGURE 5 there is shown a curve chart illustrating the operation of the apparatus shown in FIGURES 1, 2 and 4. The curve 224 represents the velocity that metering valve 52 moves vs. engine speed error for both an opening and closing direction of movement of said metering valve. The zero speed error position on curve 224 occurs at the vertical ordinate line; this point of no speed error represents a first steady state value or point where the engine is operating at a requested or desired speed. Positive speed error represents the condition where the actual engine speed exceeds the desired or steady state value whereas negative speed error represents the condition where the actual engine speed is less than the desired or steady state value. Curve 224 includes a first lower gain or slower corrective response portion A and a second higher gain or faster corrective response portion B. The transition between said first and second portions A and B of curve 224 occurs when piston member 132 of the species of FIGURES 1 and 4 is displaced a predetermined amount either upwardly or downwardly from the position illustrated in FIGURE 1. For example when the metering valve is moving in a closing direction piston member 132 is displaced upwardly and when it has traveled a sufficient distance to interconnect conduits 140 and 144, a by-pass is provided around control bleed 122 of FIGURE 1 or the control bleed 210 of FIGURE 4. When the metering valve is moving in an opening direction, piston member 132 is displaced downwardly and when it has traveled a sufficient distance to block conduits 128, 140 and 144 servo control fluid is cut off to conduit 140 thus reducing the pressure in chamber 142 and permitting a more rapid transfer of fluid from chamber 46 to chamber 142 through bleed 122 of the FIGURE 1 species or bleed 210 of the FIGURE 4 species. In the FIGURE 2 device transition from the A to B portion occurs in the valve closing direction when piston member 176 moves upwardly to interconnect conduits 182 and 184 and supply an unrestricted quantity of servo control fluid to chamber 46. In the reverse or valve opening direction of a movement transition between portions A and B occurs when piston member 176 moves sufficiently downward to interconnect conduits 184 and 186 to provide an unrestricted by-pass around bleed 160. It is to be noted that movement of piston member 132 of the FIGURES 1 and 4 species and piston member 176 of the FIGURE 2 species in either in either the upward or downward directions is controlled by the pressure differential existing between chambers 46 and 142 which is transmitted to the respective piston members by conduits. Under steady state or equilibrium conditions the pressures in the chambers 46 and 142 are equal providing a zero pressure differential when the speed error is zero. However, an off speed condition will upset the pressure balance causing a pressure differential that will position the pistons 132 or 176 in one of its directions of movement. For example, should speed exceed its steady state value requiring the metering valve to move in a closing direction for corrective action, the force produced by flyweights 32 will exceed the force of governor spring 36 and close half-ball 44 thus increasing the pressure in chamber 142. If the speed error is small the pressure increase in chamber 142 will not be sufficient to move piston member 132 or 176 to an actuating position and operation will be in the A portion of curve 224. However, if the speed error is large the pressure increase in chamber 142 will be sufficient to position the respective piston members to an actuating position and operation will be in the B or fast response portion of curve 224. Thus it is seen that the system response rate is changed as a function of the degree of speed error. For negative speed errors operation is just the reverse of that described above with half-ball 44 opening and dropping the pressure in chamber 142 thus establishing a pressure difference between chambers 44 and 142 that will move piston members 132 or 176 downwardly an amount dependent on the degree of negative speed error. As shown in FIGURE 5, a transitory higher gain characteristic C may occur along the curve 224 whenever a change in the engine operating speed is requested. This transitory higher gain characteristic C may occur for both a closing and an opening direction of the metering valve 52. It results from a change in the speed error which may occur along the lower gain portion A of the curve 224 and is caused by the volume of fluid displaced from the fluid cylinder 134 and passing into chamber 46 due to the movement of the piston member 132. Also in FIGURE 5 there is shown a second curve 226 representing the metering valve velocity vs. speed error relationship for a second steady state value which occurs at the vertical ordinate line or the point on curve 226 where speed error is zero. The shift from the first steady state point or value on curve 224 to the second steady state point or valve on curve 226 may occur at a given engine speed and be due to an exhaust nozzle area change, the firing of an afterburner, the operation of inlet guide vanes, or the like engine operational changes. It should be noted that the first portion D of curve 226 has a different slope or gain characteristic than does the first portion A of curve 224. This is due to the operation of the needle valve 212 shown in FIGURE 4. As operation of the engine is changed from a one steady state value represented by the intersection of curve 224 and the vertical ordinate line illustrated in FIGURE 5, to another value represented by the intersection of curve 226 with the vertical ordinate line, engine fuel requirements would be changed to satisfy the changed condition. It may be assumed, that the steady state point or value defined by the intersection of curve 226 and the vertical ordinate line requires less fuel than the steady state point occurring on curve 224, in which event piston 48 of FIGURE 4 will be displaced upwardly and increase the effective area of bleed 210 by withdrawing needle valve 212 upwardly. The increased area of bleed 210 will permit fuel to flow more rapidly between chambers 46 and 142 through conduits 140 and 144 and bleed 210 thus increasing the rate of response of piston 48 in the D portion of curve 226 as is indicated by its steeper slope than the A portion of curve 224. The second portion E of the curve 226 may have the same slope or gain characteristic as the second portion B of the curve 224 if desired.

It should also be noted that the apparatus of FIGURE 1 operates to provide a different gain characteristic or slope for the second portion B of the curve 224 as shown in FIGURE 5 when a comparison is made between the metering valve opening and closing directions. It is a matter of design choice which of these should have the higher velocity of movement but assume for the purpose of example that it was desirable to close the valve 52 faster than to open it; then the second portion B of curve 224 in the valve opening direction would follow the B' portion of the curve, as shown in FIGURE 5, instead of the B portion. The lower movement gain as represented by the slope of the B' portion of curve 224 and as compared to the B portion of the curve 224 is due to the positioning of the piston 132 shown in FIGURE 1 and its annular recess 130, such that the fluid conduit 144 is not connected to the fluid conduit 140. This is caused by the half-ball 44 being opened to decrease the fluid pressure in the fluid chamber 142 and thus to decrease the fluid pressure in end 133 of the fluid cylinder or chamber 134, to thereby move the piston 132 toward the end 133. Now the only fluid path between the now higher pressure fluid chamber 46 and the fluid chamber 142 is through the control bleed 122.

In the operation of the apparatus shown in FIGURE 1 the speed responsive flyweights 32 provide an input control signal or force which is a function of the operative speed of the engine. This force is opposed by the compression governor spring 36 as determined by the setting or scheduling of the control member 38 by the throttle member 40. The resultant position of the control member 34 is applied to the servo half-ball 44 such that the travel of the half-ball 44 is equal to the weight travel. Since the half-ball 44 controls the pressure within the fluid chamber 46, the main metering valve 52 will be controlled by the resultant position of the control piston 48 such that the travel of the main metering valve will be proportional to the travel of the half-ball 44 within the limitations of travel allowed in the main metering valve.

To make this system isochronous at or near top engine speed, the speed responsive weight members 32 must be so designed to have a force output variation with weight travel that approximately equals the input spring rate of the governor spring 36. Referring to FIGURE 1 momentarily, as the foot of the flyweight members 32 move upwardly to compress governor spring 36 through member 34 they travel a certain distance. At the same time the weight portion of the flyweights 32 travel outwardly increasing the distance of the weights from its spin axis thus increasing the centrifugally developed weight force output for a given speed. Thus the weight force variation due to the travel of the weights may be expressed as a force/travel relationship. If this relationship is then matched to the rate of spring 36, the governor system will have essentially an isochronous characteristic since once a speed error is induced to start the weights moving outwardly the force change due to their outward movement will balance out any increased force opposition due to compression of spring 36. If this combination of speed responsive weight members 32 and governor spring 36 are selected it is then necessary to limit the rate of servo metering valve travel rate as a function of the amount of off speed error between the desired speed as scheduled by the position of the throttle member 40 and the control member 38 and the actual engine speed as determined by the speed responsive weight members 32. This is accomplished automatically since the control area of a first side of the half-ball 44 is exposed to actuation pressure within the fluid chamber 142 and the other side of the half-ball is exposed to the input or return pressure to the fuel pump 56 which pressure $P_0$ is within the common control chamber 112 and the chamber 113 surrounding the half-ball 44. This pressure difference between the latter two pressures operates directly on the output force of the speed weights 32 and in the correct direction such that by varying the size of the half-ball 44 the amount of speed feedback can be in this manner controlled. This feedback can also be varied by the size of the main metering valve power piston 48, the spring rate of the power piston return spring 53, and the regulated servo control pressure supplied by the servo regulator 124 through the bleed member 126 to the servo system including the half-ball 44.

The above described part of the system comprises a stable governor which is approximately isochronous, but since it is isochronous it will have a high over and under shoot following an acceleration into an operating point on the engine required to run curve 204 shown in FIGURE 3. This over and under shoot movement can be controlled by the lead or like speed anticipating device including the speed weights 72 shown in FIGURE 1, which controls the position of the control piston 98 as a function of speed squared. The movement of the control piston 98 is made independent of the movement of the metering valve 52 by providing a separate speed servo system for controlling the piston of the control piston 98. The control piston 98 is hydraulically connected through fluid chamber 100 to the second control piston 102 which latter control piston 102 is directly connected to the control member 34. The volume of fluid within the fluid chamber 100 varies as a function of engine speed with the pressure differential between the control pistons 98 and 102 varying as a function of the rate of change of volume up to the pressure differential which is established by the check valves 106 and 108. The bleed passage 110 is provided to allow stable speed correction of the fuel metering valve 52. Also, the leakage through the bleed passage 110 should be adequate such that steady state fluctuation of the second rack member 96 and control piston 98 is not reflected through movement of control arm 104 to the control member 34.

When the throttle member 40 is changed in position to select a new desired speed for the engine different than the actual speed of the engine at the time of moving the throttle 40, the control member 38 unbalances the position of the control member 34 such that the output force of the speed weights 32 will be either greater or smaller than the force applied by the governor spring 36. Also, when the control member 34 begins to move the force of the control arm 104 is added to the output force of the weight members 32. In other words, the force of the control arm 104 opposes the spring force 36 when a speed change is requested such that the sum of the output force of the speed weights 32 and the force applied by the control arm 104 to the control member 34 opposes the force of the governor spring 36. For example when the throttle member 40 is moved clockwise around the fixed pivot 42 to request an increase in engine speed, the control member 38 compresses the governor spring 36 such that the output force of the speed weights 32 is no longer adequate to balance the force of the governor spring 36. Here the output force of the speed weights 32 in addition to the anticipating speed force of the control arm 104 opposes the force of the governor spring 36 such that the metering valve 52 will be subjected to a force balance prior to the time that the output force of the speed weights 32 alone will balance the force of the governor spring 36. In this sense the action of the control arm 104 gives a speed anticipating effect to cut off the resultant acceleration rate flow of fuel to the engine at an earlier point along the acceleration curve 200 of FIG- URE 3 than would occur without the speed anticipating control arm 104 and its associated apparatus including the speed weights 72 such that the engine is started to decelerate at an earlier time period to further decrease the rate of speed weight 32 force build up until the output force of the speed weights 32 per se will balance the force of the compressed governor spring 36.

The apparatus operates in the opposite manner for a requested decrease in the engine operating speed by the control throttle member 40.

When the actual engine operating speed as determined by the speed responsive weights 32 is substantially the same as the scheduled speed as determined by the control throttle member 40, the fluid pressure within the fluid chamber 46 is substantially in balance with the fluid chamber 142. However, should the control throttle member 40 be moved in a counterclockwise direction to request or schedule a decrease in the engine speed and hence a decrease in the fuel supplied to the engine, the control member 34 will be moved by the output force of the speed weights 32 to close the half-ball member 44 such that the fluid pressure within the fluid chamber 142 thereby rises and due to the control bleed 122 positioned within the fluid conduit 120 the fluid pressure within the fluid chamber 46 cannot build up as fast as the rise in the fluid pressure within the fluid chamber 142. Further the power piston 48 begins to move in an upward direction due to the increase in the fluid pressure within the chamber 46 to further prevent a similar rise in the fluid pressure within the chamber 46. Therefore, a pressure drop or differential occurs across the control bleed member 122, which pressure differential controls the flow of fluid from the fluid chamber 142 into the fluid chamber 46, and therefore the size of the control bleed 122 determines the movement rate of the power piston 48. For a large change in the operative speed of the engine or a large speed error between the actual speed and the desired or scheduled speed as determined by the throttle member 40, the build up or rise in the pressure of the control fluid within the fluid chamber 142 is very rapid. This same control pressure within the fluid chamber 142 is applied through the fluid conduit 140 and the fluid conduit 146 to the fluid chamber 133 at the first end of the control piston 132, such that the control piston 132 or lag piston 132 is moved upward such that the fluid pressure within the fluid chamber 142 and the fluid conduit 140 and the annular recess 130 is communicated through the fluid conduit 144 to the fluid chamber 46 and in this manner the pressure differential across the control bleed 122 is thereby limited. This causes the power piston 48 to be moved at a faster rate.

On the other hand if a sudden increase in engine operative speed is requested by the throttle member 40 the control member 34 moves the servo half-ball 44 in an opening direction such that there results a drop in the fluid pressure within the chamber 142. This drop in pressure causes the lag piston 132 to close the fluid path through the annular recess 130 and between the fluid conduit 140 and the fluid conduit 144 which leads to the fluid chamber 46, such that the balancing of the fluid pressures between the fluid chamber 46 and the fluid chamber 142 must occur through the control bleed 122.

In the apparatus shown in FIGURE 2 rapid movement of the power piston 48 is accomplished in both directions for increasing and decreasing of the fuel flow to the engine, by the control piston 176 operating in conjunction with the adjustable bleed member 160 and the servo half-ball 44. For example, when a sudden increase in the engine operative speed is requested by clockwise movement of the throttle member 40 the spring member 36 overcomes the output force of the speed weights 32 to move the servo half-ball 44 in its opening direction. This reduces the fluid pressure within the chamber 142 and similarly reduces the fluid pressure within the chamber 170 at the end of the control piston 176 such that the now higher pressure within the fluid chamber 46 passes through the adjustable bleed 160 into the fluid chamber 142 and also passes from the fluid conduit 184 through the second annular recess 180 into the fluid conduit 186 and hence through the fluid conduit 166 to the fluid chamber 142. This gives a rapid movement to the power piston 48 in the downward direction as illustrated in FIGURE 2 to result in a corresponding rapid increase in the fuel supply to the engine through the metering valve 52.

On the other hand, if a sudden decrease in the engine speed is requested by a counterclockwise movement of the throttle member 40 the output force of the speed weights 32 overcomes the force of the compression spring 36 such that the half-ball 44 is moved in a closing direction to thereby increase the fluid pressure within the chamber 142 above and relative to the fluid pressure within the chamber 46. This initiates a fluid flow from the chamber 142 through the adjustable bleed member 160 into the fluid chamber 46, and also increases the fluid pressure within the fluid chamber 170 such that the control piston 176 is moved in an upward direction to connect the regulated servo pressure fluid conduit 182 through the first annular recess 178 with the fluid conduit 184 and hence the fluid chamber 46. This results in a rapid upward movement of the power piston 48 to thereby rapidly decrease the flow of fuel to the engine.

Therefore it will be seen that in the apparatus of FIGURE 2 there has been provided a speed responsive control bleed 160 between the fluid chamber 142 and the fluid chamber 46. Further, the pressure differential between the fluid chamber 142 and 46 is applied to the spring centered response control piston 176 such that it acts as an accumulator and a speed responsive control for the by-pass of the control bleed 160. This allows a variable response as a function of speed error signal in the movement of the metering valve 52.

This invention contemplates the use of known types of servo mechanisms wherever needed to provide power operation.

Although only three embodiments of the present invention have been schematically illustrated and described it will be apparent to those skilled in the art that various changes in the structure and relative arrangement of parts may be made to suit individual requirements without departing from the spirit and scope of the present invention.

I claim:

1. In fuel control apparatus for an engine, a fuel metering valve means for controlling the fuel supply to the engine, a fluid pressure responsive element actuated by the pressure of a control fluid and connected to said fuel metering valve means, servo valve means, a restrictive passage communicating the control fluid acting on said fluid pressure responsive element to said servo means such that said servo means is operative for controlling the pressure of said control fluid, a movable needle valve connected to said fluid pressure responsive element and positioned thereby, said needle valve being operative with said restrictive passage to vary the resistance to fluid flow therethrough, an engine speed responsive element operatively connected to said servo valve means for controlling said servo valve means as a function of engine speed, a governor spring member connected to said servo means, a throttle control member connected to said spring member for resetting said spring member in accordance with a desired engine operation, a conduit in parallel flow relationship with said restrictive passage and connected to said servo valve and said control fluid acting on said fluid pressure responsive element, a shuttle valve having a first and second position and operative with said conduit to interrupt fuel flow therethrough when in said first position and prevent flow therethrough when in said second position, means connected to said servo valve and said shuttle valve to position said shuttle valve from said first to said second position in response to movement of said servo valve.

2. In fuel control apparatus for an engine, a fuel metering valve means for controlling the fuel supply to the engine, a fluid pressure actuable element responsive to the pressure of a first control fluid and connected to said fuel metering valve means, servo valve means for controlling the pressure of said first control fluid, an engine speed responsive element operatively connected to said servo valve means for transmitting a control force to said servo valve means which varies as a function of engine speed, governor spring means connected to said engine speed responsive element, and a throttle control member connected to said spring means for resetting said spring means in accordance with a desired engine operating speed, a first fluid chamber containing said first control fluid, a second fluid chamber containing a second control fluid, a restrictive orifice member connected between said first and second fluid chambers, a movable needle valve connected to said fluid pressure actuable element and positioned thereby, said needle valve being operative with said restrictive orifice to vary the effective size thereof, a conduit connecting said first and second fluid chambers and by-passing said restrictive orifice, and a valve member having a first and second position in said conduit and operative when in said first position to prevent fluid flow and when in said second position to permit fluid flow through said conduit, said valve member being further connected to said servo valve means such that said servo valve member is operative to position said valve member in either said first or said second position.

3. A fuel control apparatus as claimed in claim 2 wherein said valve member includes resilient means for biasing said valve member in said first position and fluid pressure responsive means for moving said valve member from said first to said second position.

4. In fuel control apparatus for an engine, a fuel metering valve means for controlling the fuel supply to the engine, a fluid pressure actuable element responsive to the pressure of a first control fluid and connected to said fuel metering valve means, servo valve means for controlling the pressure of said first control fluid, an engine speed responsive element operatively connected to said servo valve means for transmitting a control force to said servo valve means which varies as a function of engine speed, governor spring means connected to said engine speed responsive element, and a throttle control member connected to said spring means for resetting said spring means in accordance with a desired engine operating speed, a first fluid chamber containing said first control fluid, a second fluid chamber containing a second control fluid, a restrictive orifice member connected between said first and second fluid chambers, a movable needle valve connected to said fluid pressure actuable element and positioned thereby, said needle valve being operative with said restrictive orifice member to vary the effective size thereof, a conduit connecting said first and second fluid chambers and by-passing said restrictive orifice, flow control means connected to said servo valve means and said conduit for controlling the flow therethrough as a function of the position of said servo valve means.

5. In fuel control apparatus for an engine, a fuel metering valve means for controlling the fuel supply to the engine, a fluid pressure actuable element responsive to the pressure of a first control fluid and connected to said fuel metering valve means, servo valve means for controlling the pressure of said first control fluid, an engine speed responsive element operatively connected to said servo valve means for transmitting a control force to said servo valve means which varies as a function of engine speed, governor spring means connected to said engine speed responsive element, and a throttle control member connected to said spring means for resetting said spring means in accordance with a desired engine operating speed, a first fluid chamber containing said first control fluid, a second fluid chamber containing a second control fluid, a restrictive orifice member connected between said first and second fluid chambers, a movable needle valve connected to said fluid pressure actuable element and positioned thereby, said needle valve being operative with said restrictive orifice member to vary the effective size thereof, a fluid connection between said first and second fluid chambers in parallel flow relationship with said restrictive orifice, means connected to said engine speed responsive element and said fluid connection for controlling the flow of fluid through said connection as a function of engine speed.

6. In fuel control apparatus for an engine, a fuel metering valve means for controlling the fuel supply to the engine, a fluid pressure actuable element responsive to the pressure of a first control fluid and connected to said fuel metering valve means, servo valve means for controlling the pressure of said first control fluid, an engine speed responsive element operatively connected to said servo valve means for transmitting a control force to said servo valve means which varies as a function of engine speed, governor spring means connected to said engine speed responsive element, and a throttle control member connected to said spring means for resetting said spring means in accordance with a desired engine operating speed, a first fluid chamber containing said first control fluid, a second fluid chamber containing a second control fluid, a restrictive orifice member connected between said first and second fluid chambers, a movable needle valve connected to said fluid pressure actuable element and positioned thereby, said needle valve being operative with said restrictive orifice member to vary the effective size thereof, a fluid connection between said first and second fluid chambers in parallel flow relationship with said restrictive orifice, means connected to said throttle control member and said fluid connection for controlling the flow of fluid through said connection as a function of the position of said throttle control member.

7. In fuel control apparatus for an engine, a fuel metering valve means for controlling the fuel supply to the engine, a fluid pressure actuable element responsive to the pressure of a first control fluid and connected to said fuel metering valve means, servo valve means for controlling the pressure of said first control fluid, an engine speed responsive element operatively connected to said servo valve means for transmitting a control force to said servo valve means which varies as a function of engine speed, governor spring means connected to said engine speed responsive element, and a throttle control member connected to said spring means for resetting said spring means in accordance with a desired engine operating speed, a first fluid chamber containing said first control fluid, a second fluid chamber containing a second control fluid, a restrictive orifice member connected between said first and second fluid chambers, a movable needle valve connected to said fluid pressure actuable element and positioned thereby, said needle valve being operative with said restrictive orifice member to vary the effective size thereof, a fluid connection between said first and second fluid chambers in parallel flow relationship with said restrictive orifice, means connected to said engine speed responsive element and said throttle control member, said last named means being further connected to said fluid connection for controlling the flow of fluid through said connection as a function of the difference between engine speed as sensed by said engine speed responsive element and desired engine operating speed as transmitted by said throttle control member.

(References on following page)

References Cited in the file of this patent

UNITED STATES PATENTS

| | | |
|---|---|---|
| 1,976,659 | Dickinson | Oct. 9, 1934 |
| 2,039,507 | Woodward | May 5, 1936 |
| 2,478,753 | Parker | Aug. 9, 1949 |
| 2,576,352 | Neal | Nov. 27, 1951 |
| 2,623,504 | Rodeck et al. | Dec. 30, 1952 |
| 2,759,549 | Best | Aug. 21, 1956 |
| 2,765,800 | Drake | Oct. 9, 1956 |
| 2,874,764 | Booth et al. | Feb. 24, 1959 |

FOREIGN PATENTS

| | | |
|---|---|---|
| 694,083 | Great Britain | July 15, 1953 |
| 696,452 | Great Britain | Sept. 2, 1953 |